United States Patent [19]

Waclawek

[11] 3,848,409
[45] Nov. 19, 1974

[54] TRANSMISSION SYSTEM

[75] Inventor: Miczyslaw J. Waclawek, Mishawaka, Ind.

[73] Assignee: Clark Equipment Company, Buchanan, Mich.

[22] Filed: Oct. 9, 1973

[21] Appl. No.: 404,558

[52] U.S. Cl............... 60/345, 60/346, 60/361, 74/718
[51] Int. Cl........................... F16h 47/06
[58] Field of Search ............ 60/330, 341, 345, 346, 60/347, 361, 364, 362; 74/664, 720, 718

[56] References Cited
UNITED STATES PATENTS

| | | | |
|---|---|---|---|
| 3,102,435 | 9/1963 | Shealy | 74/730 |
| 3,478,621 | 11/1969 | Johnson et al. | 74/688 |
| 3,526,155 | 9/1970 | Waclawek | 74/718 |

*Primary Examiner*—Edgar W. Geoghegan
*Attorney, Agent, or Firm*—Ernst H. Ruf

[57] ABSTRACT

A transmission system including a hydrodynamic torque converter having a torque regenerative element interconnected with the impeller and capable of absorbing energy from the torque converter fluid flow circuit, this energy absorption being at a maximum when the torque converter is stalled and diminishing as the torque converter increases in speed ratio. Included in the several modes of operation, the torque absorbed from the fluid flow circuit may be redirected to the impeller and/or utilized to drive auxiliary equipment, such as hydraulic pumps.

21 Claims, 4 Drawing Figures

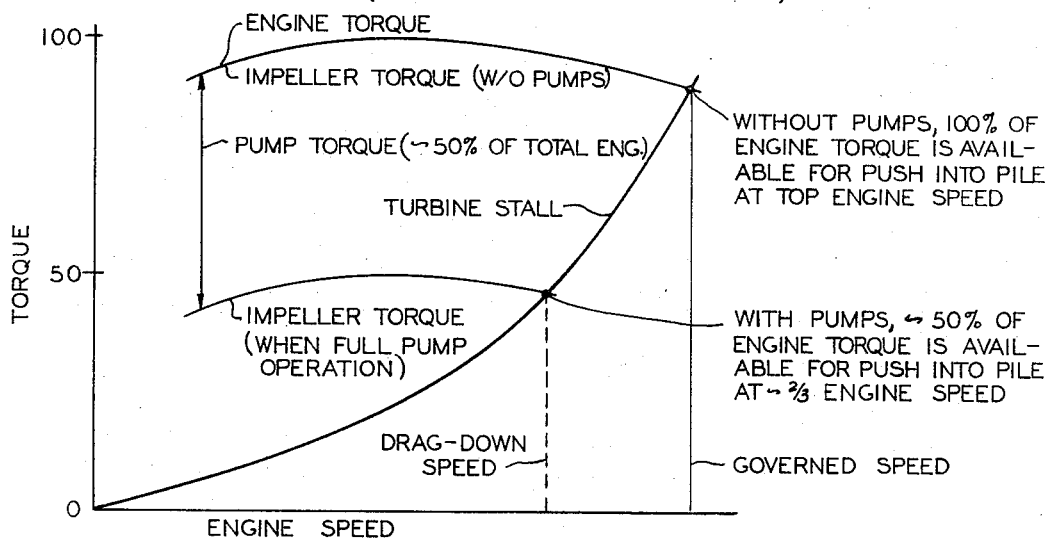
FIG. 3 PRIOR ART - KNOWN SYSTEM W/O TORQUE REGENERATION
(PUMPS AT 50% ENGINE TORQUE)
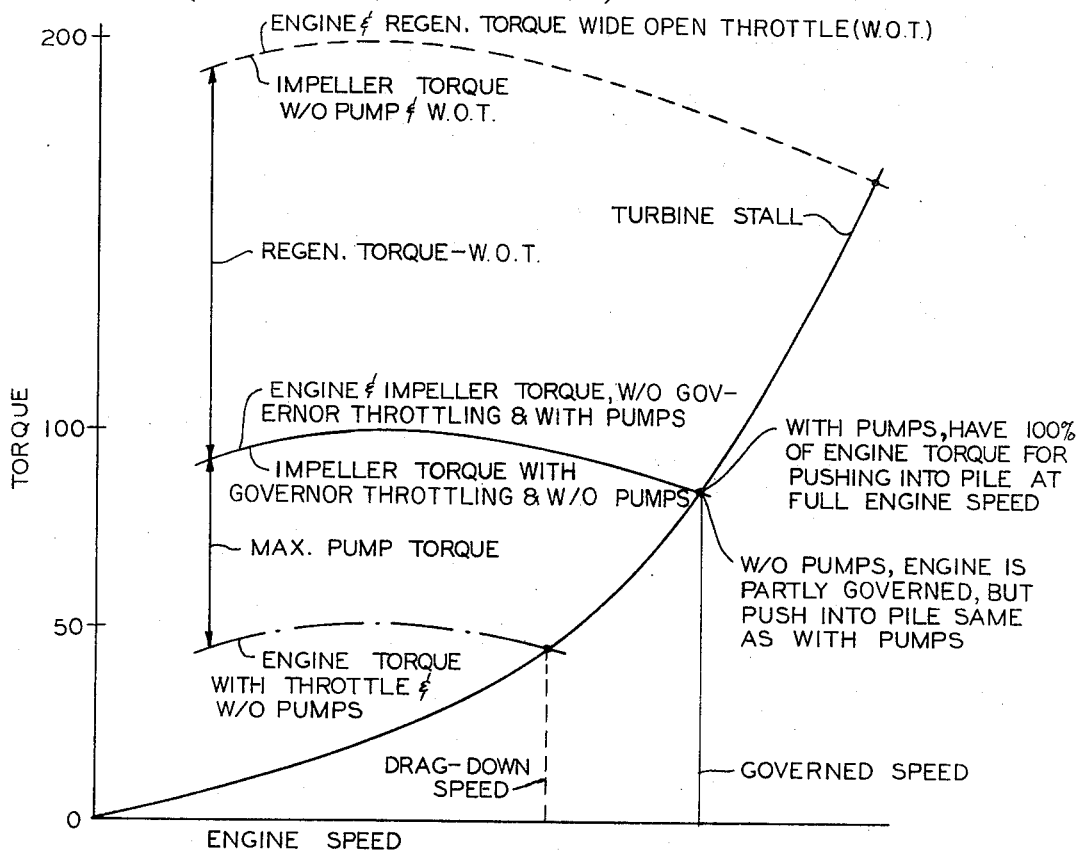
FIG. 4 SYSTEM WITH 0.5 TORQUE REGENERATION
(PUMPS AT 50% ENGINE TORQUE)

TRANSMISSION SYSTEM

BACKGROUND OF THE INVENTION

1. Field of the Invention

The field of art to which this invention pertains includes industrial or construction equipment power transmission mechanisms and systems; more specifically, such mechanisms or systems including a fluid drive having a torque regenerative element. An object of this invention is to provide an improved transmission system that is simple in construction, has improved operating characteristics at low speed, and is automatic.

2. Description of the Prior Art

In mobile industrial or construction equipment torque converter applications, where large amounts of power or torque are required from the engine to run auxiliary equipment, such as hydraulic pumps in loaders and scrapers, a problem exists in that the torque converter, when operating at large differentials of torque levels, will operate at large differentials in engine speed (converter absorption determines engine speed); i.e., large torque variations on the impeller equal large variations in torque converter absorption which in turn equal large variations in engine speed. The problem is that if the engine operates at large differentials in speed, the auxiliary equipment operates at different speeds; thus, if the auxiliary equipment is designed to operate at high speeds, and the engine runs at low speed, it, therefore, runs for an extended length of time at below design speed, which, of course, makes for inefficient auxiliary equipment operation, in that it does not utilize the full engine horsepower that is available.

One possible solution to the previously defined problem is to maintain the torque on the impeller constant and maintain the K factor (more fully discussed later) constant for a large speed range of the torque converter, then the engine speed (and, consequently, the auxiliary equipment speed) can be maintained for a large range of vehicle speeds. However, a primary problem in industrial equipment (loaders, for example) is that it is heavily taxed while pushing into the work pile, where the vehicle speed is very low; therefore, for a loader, it is only important that constant input torque to the torque converter impeller be maintained for all operating conditions of the auxiliary equipment.

One solution is to be able to vary the absorption (K factor) of the impeller at each speed ratio. In the case of a loader, at stall, this can be done by using variable pitch blading to control the outlet angles on one or more of the fluid members (such as the impeller and/or the reactor) in order to maintain more nearly constant engine speed. Since it is less difficult to vary the output angle of the stationary reactor, this solution has generally been used in the past.

Because the problem really lies in the variation in engine speed, which directly affects the speed of the auxiliary equipment, another way to prevent this is to insert a slipping clutch between the engine and the impeller; then, the impeller absorption can vary (and the impeller speed will change), but the slipping clutch will maintain the engine speed at the desired level. An automatic control is generally utilized to permit slippage of the clutch and thereby maintain constant engine speed in this known solution.

SUMMARY OF THE INVENTION

In carrying out this invention in several preferred embodiments thereof, each embodiment has included a hydrodynamic or hydrokinetic torque converter with an impeller, a turbine and a reactor. An auxiliary element precedes the impeller and a torque regenerative element is located in the torque converter fluid flow circuit between the reactor and the auxiliary element, with the torque regenerative element being drivingly connected to the impeller. The torque regenerative element absorbs a maximum amount of torque from the torque converter fluid flow circuit when the torque converter is stalled, with this absorption diminishing as the torque converter increases in speed ratio. Means can be provided for disconnecting the torque regenerative element from the impeller when the torque regenerative element stops removing energy from the fluid flow circuit as the turbine output speed increases.

It is possible to take work out of the fluid circuit at low torque converter speeds because all of the engine power is being turned into heat at the torque converter stall point. Since there is a potential of removing nearly all of the energy imparted to the torque converter fluid by the engine at torque converter stall, therefore, at low speeds, the engine power needed to run the auxiliary equipment can readily be supplied by the torque regenerative element. At higher torque converter speeds, since the torque regenerative element is not able to supply all the power required by the auxiliary equipment, the torque regenerative element must also be drivingly connected to the engine, via the impeller, so that the engine can supply the needed difference in power. While the torque regenerative element, by reason of its connection with the impeller, is rotating at engine speed, it will be drawing the maximum amount of torque designed for the auxiliary equipment, but if the auxiliary equipment requires only a portion of this torque, the remainder thereof is imparted to the impeller. The additional torque on the impeller tends to overspeed the engine which will now be throttled by the governor, which in turn will result in better fuel economy.

In one of the preferred embodiments, the auxiliary element preceding the impeller is a second reactor, while in another preferred embodiment, the auxiliary element is a second turbine.

The phrase "torque or element regeneration," which will be more fully defined later, may be summarized as the taking of energy from a torque converter fluid circuit and routing it back to the impeller.

The principal objects, features and advantages of this invention will be more readily understood by a person skilled in the arts when following the detailed description in conjunction with the drawings.

BRIEF DESCRIPTION OF THE DRAWINGS

FIG. 3 is a graphical representation of a prior art transmission system without torque regeneration.

FIG. 4 is a graphical representation of the transmission system of this invention utilizing torque regeneration.

DESCRIPTION OF THE PREFERRED EMBODIMENTS

Figure 1:
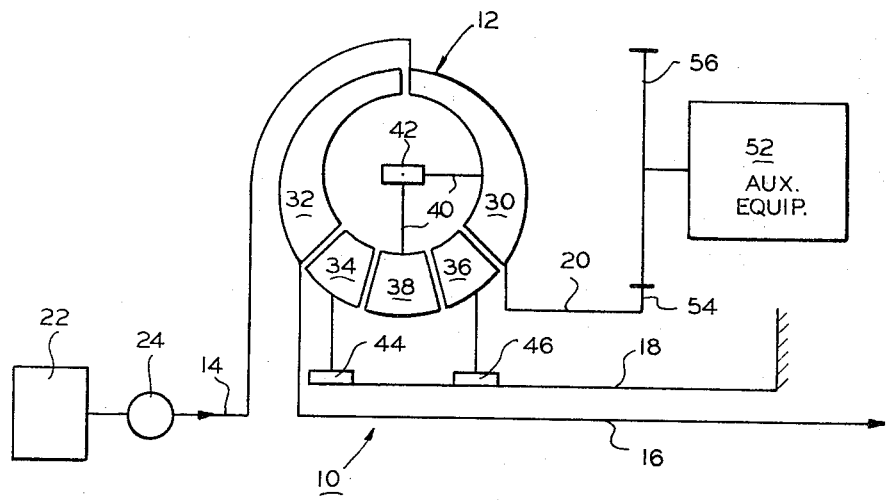
FIG. 1 is a schematic representation of a preferred embodiment of the transmission system embodying this invention.

Referring now to FIG. 1, the reference numeral 10 generally denotes a transmission system including a hydrodynamic or hydrokinetic torque converter 12, with the torque converter having a housing (not shown) in which an input means or shaft 14, turbine output shaft 16 and auxiliary or impeller output shaft 20 are journaled for rotation.

Impeller input means 14 is driven, for example, by any prime mover or suitable source of power, such as an internal combustion engine, schematically designated by numeral 22, with the maximum speed of prime mover 22 preferably being controlled by a regulating device or governor 24.

Torque converter 12 includes an impeller 30, a turbine 32, a stator or reactor 34, an auxiliary element 36 preceding impeller 30 and a torque regenerative element 38 located between reactor 34 and auxiliary element 36.

In the FIG. 1 embodiment, which is preferably utilized for industrial or construction equipment applications, it should be noted that auxiliary element 36 takes the form of another or second reactor which, similar to reactor 34, is also connected to the stationary shaft or support 18. Reactors 34 and 36 are preferably connected to stationary shaft or support 18 by means of one-way brakes or clutches 44 and 46, respectively, so that reactors 34 and 36 can overrun in a forward direction as the speed ratio of torque converter 12 approaches one. In addition, torque regenerative element 38 is connected to impeller 30 by means of a connecting element 40 which preferably includes a one-way brake or clutch 42 so that torque regenerative element 38 can disconnect from impeller 30 when it stops removing energy from the torque converter fluid circuit as will later be explained in more detail. Turbine output shaft 16 is, of course, connected to and driven by turbine 32.

The auxiliary or impeller output shaft 20, which is connected to and driven by impeller 30 and/or regenerative element 38 (by reason of its connection to impeller 30) drives one or more pieces of auxiliary equipment 52 by means of a gear train comprising gears 54 and 56. The auxiliary equipment generally takes the form of one or more hydraulic pumps of well known construction which serve to provide pressurized fluid to operate the various fluid actuated accessories generally used in mobile construction machinery, such as buckets on front end loaders, for example.

In hydrodynamic torque converter 12, impeller 30, turbine 32, reactors 34 and 36, as well as torque regenerative element 38, are all bladed wheels and cooperate in forming a toroidal chamber which is filled with a working fluid.

Figure 2:
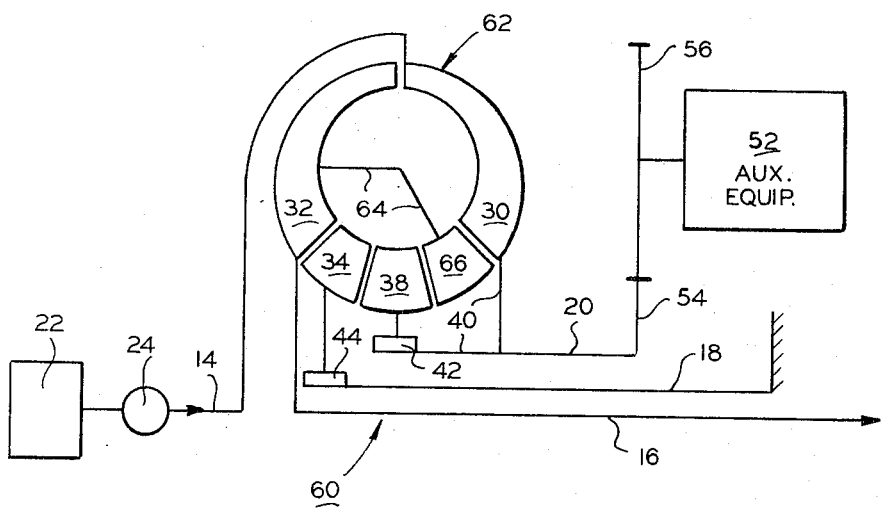
FIG. 2 is a schematic representation of another preferred embodiment of the transmission system embodying this invention.

Referring now to FIG. 2, there is shown another embodiment 60 of the transmission system of this invention. To the extent that this embodiment is the same as previously described transmission 10 in FIG. 1, reference is made here to this preceding description, with like numerals being applied to like parts. A comparison of FIGS. 1 and 2 will show that in transmission system 60 (FIG. 2), a hydrodynamic torque converter 62 is utilized in place of hydrodynamic torque converter 12 in FIG. 1. It will be seen that auxiliary element 66 takes the form of another or second turbine that is connected to first turbine 32 (and thus to turbine output shaft 16) by means of a connecting element 64. Torque regenerative element 38 is again connected to impeller 30 (and thus auxiliary output shaft 20) through connecting element 40 which preferably again includes one-way brake or clutch 42. Reactor 34 preferably is again connected to stationary support 18 by means of one-way brake or clutch 44 so that reactor 34 can overrun in a forward direction as the speed ratio of torque converter 62 approaches one.

In FIG. 1, rotation of impeller 30, by prime mover 22, circulates the working fluid in the toroidal chamber, with the fluid transmitting energy from the impeller 30 to turbine 32. Since reactor 34 is fixed during the low speed operation of the torque converter, it redirects the working fluid so that its impingement on torque regenerative element 38 causes it to absorb energy from the toroidal fluid flow circuit. Reactor 36 again redirects the direction of the working fluid which thereafter then flows back to the impeller at a more favorable angle, and the working cycle is thereafter repeated. The operation of the FIG. 2 embodiment is similar to that of FIG. 1, except that instead of a second reactor, a second turbine 66, connected to primary turbine 32, is utilized.

Before proceeding with a more detailed description of the exact operation of the transmission system of this invention, it may be best to briefly discuss the term "regeneration." A conventional three-element (impeller, turbine and reactor) torque converter is classified as "fluid regenerative" because the reactor directs the working fluid back to the impeller in the same direction as impeller rotation. Thus, the working fluid entering the impeller already possesses energy, and the engine need only add a make-up portion to keep the working fluid circulating.

Overall, torque multiplication of a torque converter can be increased by adding another turbine and reactor in series in the fluid circuit and connecting the turbines in parallel. This system is still considered "fluid regenerative" because the second reactor sends the fluid to the impeller in the same direction as impeller rotation. Torque converters with dual turbines in this arrangement are called two-stage systems, and more turbines produce additional stages. When torque multiplication is increased by multistage turbines, fluid regeneration is not essential and is usually dispensed with. In this kind of an arrangement, the last stage turbine precedes the impeller, and the fluid flow, entering the impeller at lower output speeds, is opposite or counter to the direction of impeller rotation. This results in a substantially lower K factor when compared to an equal size fluid regenerative converter. The torque converter absorption speed factor may be defined as:

$$K = N_I / \sqrt{T_I}$$

where:
$N_I$ = impeller speed
$T_I$ = impeller torque

Torque converter performance is presented in terms of torque ratio, $t$ (turbine torque divided by impeller torque), and the K factor. These two factors are adequate to solve for output performance of any engine-torque converter combination. Torque converter performance is a function of circulating flow velocity and the amount of directional change imparted to the fluid by the blade curvatures. Large circulating flow and large fluid deflection by the turbine relative to that of the impeller result in high torque multiplication; however, large blade camber produces increased restriction to circulating flow. A greater number of blades tends toward more effective fluid deflection but also adds to the restriction of circulating flow. A larger number of blades tends to lessen slip at higher speed ratios, while a lower number of blades increases circulating flow velocity at the lower speeds and results in higher torque multiplication.

It should be clear at this time that in the FIG. 1 embodiment, since reactor 36 precedes impeller 30, there is fluid regeneration. It should also be noted that in the FIG. 2 embodiment, since second turbine 66 precedes impeller 30, there is no fluid regeneration.

Conventional torque converter multistage systems consist of multiple turbines disposed in series in the fluid circuit and connected in parallel to the output. The overall torque ratio, $t$, is equal to the summation of all the turbine ratios, $t_{T_1}$ plus $t_{T_2}$, etc..

When energy is taken from the fluid circuit in a torque converter by means of a torque regenerative element E, connected to the impeller I, and is thus fed back into the impeller, the multiplication (in the torque converter) acts on both the engine torque and the feedback torque that is routed back into the impeller. A system of this type may be termed "torque or element" regenerative. The overall torque ratio, $t$, is:

$$t = t_T/1 - t_E$$

where:
$t_T$ = turbine torque ratio
$t_E$ = regenerative element torque ratio and the total impeller torque ratio, $t_I$, is:

$$t_I = 1/1 - t_E$$

The system is truly torque-regenerative when the fluid forces on the impeller-connected torque regenerative element are in the same direction as the impeller rotation. Thus, basically, "fluid" regeneration occurs when the working fluid has a favorable fluid angle on entrance to the impeller; whereas, "torque or element" regeneration occurs when energy, that is taken or absorbed from the fluid circuit, is mechanically routed back to the impeller.

In torque converter 12, shown in FIG. 1, since there is only one turbine stage 32, there can be no summation of turbine ratios, but there is fluid regeneration (because of reactor 36 preceding impeller 30) and there is torque regeneration since torque regenerative element 38 is connected to impeller 30. Thus, torque converter 12 has both fluid and torque regeneration, with the total impeller torque ratio, $t_I$ being:

$$t_I = 1/1 - t_E$$

In torque converter 62, shown in FIG. 2, since there are two turbine stages, namely, elements 32 and 66, there is a torque ratio summation, but there is no fluid-regeneration (second turbine 66 produces an unfavorable angle on the working fluid prior to its entrance to impeller 30). There also is element or torque regeneration since torque regenerative element 38 is connected to impeller 30. Thus, torque converter 62, having two turbine stages 32 ($t_{T_1}$) and 66 ($t_{T_2}$), one impeller stage 30, one reactor stage 34 and one torque regenerative element 38, is not fluid-regenerative but is, however, torque regenerative. The overall torque ratio, $t$, of this system is:

$$t = t_{T_1} + t_{T_2}/1 - t_E$$

The total impeller torque, $t_I$ is:

$$t_I = 1/1 - t_E$$

The term "regeneration" is used in the "pull-yourself-up-by-the-bootstrap" sense, and it should be noted that since torque regenerative element 38 is connected to impeller 30, it is "input" coupled. In torque converter design, torque multiplication is gained faster (at stall) by regeneration, i.e., by input coupling than by "staging," i.e., output coupling, with output coupling being well known in the art.

In the transmission systems of this invention, engine 22 is permitted to solely drive impeller 30; thus, the torque converter absorption remains constant and the engine speed remains constant. If auxiliary equipment 52 is driven by additional or torque regenerative element 38 in the torque converter circuit, any variation of load on the auxiliary equipment will only affect that element. It is possible to take work out of the fluid circuit at low torque converter speeds because substantially all of the engine power is being turned into heat at or near the torque converter stall point.

There is a potential of removing nearly 100 percent of the energy imparted to the torque converter fluid by the engine at torque converter stall, with this potential diminishing to approximately 15 percent at higher converter speeds (at converter maximum efficiency) so that at low speeds, the approximately 40 to 70 percent of engine power often needed to run the auxiliary equipment, can be supplied by the torque regenerative element. Since at higher converter speeds the torque regenerative element is not able to supply all of the power required by the auxiliary equipment, it must also be drivingly connected to the engine (via the impeller) so that the engine can supply the needed difference in power. This also prevents the auxiliary equipment from overspeeding when not drawing full power from the fluid circuit through the torque regenerative element. Since the torque regenerative element, under these conditions, is still rotating at engine speed, it will be drawing the maximum amount of torque designed for the auxiliary equipment, but if the auxiliary equipment requires only a portion of this torque, the remainder thereof is imparted to the impeller. The additional torque on the impeller tends to overspeed the engine (engine and impeller are drivingly connected) which will then be throttled by the governor which in turn will result in better fuel economy.

Another way of looking at this invention is that, as long as the engine has to supply both the torque to the torque converter impeller and to the auxiliary equipment, whatever torque is used by the auxiliary equipment is lost to the impeller and because engine speed is affected by torque absorption of the impeller, the torque lost through the impeller must be made up if constant engine speed is to be maintained. This can be done by taking torque out of another part of the fluid circuit and redirecting it to the impeller, this being accomplished via the additional element, namely, torque regenerative element 38, in an appropriate part of the fluid circuit.

A yet further way to look at this invention is that the engine governor can be set to maintain full engine torque at governed speed (without throttling). Torque is supplied to the impeller by the prime mover and a torque regenerative element in an appropriate part of the fluid circuit. This arrangement will feed excess torque to the impeller at low converter speeds and the engine governor will throttle the engine to maintain governed speed. If the auxiliary equipment is also tied to the impeller, then the excess torque will be used to run this auxiliary equipment, and if it is not operative, the governor will throttle the engine, when necessary, to maintain speed. At higher speeds, where feedback torque is not sufficient or nonexistent, the engine will have to directly supply, through the impeller, the torque required to operate the auxiliary equipment.

Basically, the performance of a hydrodynamic torque converter may be improved at the low end, that is, the torque multiplication can be increased at stall by the addition of a torque regenerative element into the torque converter fluid circuit wherein this element is connected to the impeller and absorbs energy from the fluid circuit. This can be accomplished by judicious choice of blade angles for the torque regenerative element. Since the torque regenerative element absorbs energy or takes energy from the fluid circuit and since it is connected to the impeller, it can be said to act in a regenerative manner, i.e., it transfers torque back to the impeller. However, as the output speed of the turbine increases, the blade angles of the regenerative element become less favorable and eventually, as the speed increases further, instead of absorbing energy from the fluid, energy is actually imparted into the fluid. This is the reason why regenerative element 38 is preferably equipped with a one-way clutch or brake 42 which, when the energy-imparting stage is reached, permits regenerative element 38 to freewheel.

It should be clear from the preceding description that when torque is absorbed by regenerative element 38 from the toroidal fluid circuit, it is either:

a. fully redirected to impeller 30 for driving turbine 32 in a first mode of operation when the auxiliary equipment is drawing substantially no power; or b. utilized to fully drive impeller output shaft 20, via impeller 30, in a second mode of operation when the auxiliary equipment is drawing maximum power and at low turbine output speeds; or c. partially redirected to impeller 30 (for driving turbine 32) and for fully driving impeller output shaft 20 (via impeller 30) in a third mode of operation when the auxiliary equipment loads are moderate; or d. combined with input torque (from engine 22 via impeller 30) to drive both turbine 32 and impeller output shaft 20, at higher turbine output speeds, in a fourth mode of operation.

It should also be understood that engine governor 24 controls the maximum speed of engine 22, with governor 24 reducing the speed of engine 22 in the modes of operation noted hereinabove wherein the absorbed torque is redirected to impeller 30 for driving at least turbine 32 in order to prevent impeller 30 from exceeding a predetermined maximum speed. In addition, one-way brake or clutch 42 is preferably utilized for disconnecting torque regenerative element 38 from impeller 30 (and impeller output shaft 20) when torque regenerative element 38 reaches the condition where it stops absorbing energy from and starts imparting energy into the toroidal fluid flow circuit.

The two transmission systems 10 and 60, respectively, described herein, for example, are well suited for use on front end loaders and other like applications requiring large amounts of torque for running auxiliary equipment, such as high capacity hydraulic pumps. As shown in FIG. 3, if a normal converter match is set that torque converter turbine stall occurs at engine governor speed, the engine will drag down when the pumps are in full operation. This means the pump speed is down and the hydraulic capacity falls off as the pumps are demanding more pressure, i.e., as the engine drags down, the pumps slow down and the hydraulic work slows down. In a known system without torque regeneration, such as that shown in FIG. 3, at turbine stall, when the pumps are in full operation, about 50 percent of the engine power is used by the auxiliary hydraulics for doing useful work; the other 50 percent is lost in heat even though it produces the desired drawbar pull. If, for example, the converter or turbine stall were set for full pump operation, the engine would always be throttled when the pumps are not operating, and full engine torque could not be realized when the pumps are inactive. In addition, a larger engine would be required for this type of a setup.

As shown in FIG. 4, with torque regenerative element feedback to the impeller, the converter or turbine stall can be set at governed speed when the pumps are not operating. The torque regenerative element feedback can be assumed to operate the pumps. If the pumps are not used, the engine will be throttled by the engine governor in the amount of the torque regenerative element feedback. In transmission systems 10 and 60, the torque regenerative element feedback is really useful energy or power coming out of the torque converter when the torque converter is stalled. This indicates that the gains due to torque regenerative element feedback are realized by more efficient torque converter operation. This also means that these gains diminish as the torque converter increases in speed ratio and less losses are available for converting into useful work. The physical explanation is that reaction torque drops off as the turbine picks up in speed. Thus, it should be apparent from FIG. 4 that even at turbine stall, torque regenerative element 38 is rotating and thus powering the auxiliary pumps. If the pumps are not pressurized, then, of course, the torque from torque regenerative element 38 is fed back into impeller 30 so that the multiplication of the torque in either torque converters 12 or 62 acts on both the engine torque and the feedback torque that is routed into the impeller, and regeneration results. Of course, as the turbine speed increases, the torque output of element 38 decreases and a point will be reached when the engine, through impeller 30, will be driving auxiliary pumps 52 directly.

If the feedback torque is designed to equal 0.5 of engine torque, at torque converter turbine stall, the following results are obtained:

| | Known System | System With Torque Regeneration |
|---|---|---|
| Converter Torque Ratio | 2.5 | 2.5 |

|  | Known System | System With Torque Regeneration |
|---|---|---|
| Overall Output Torque Ratio | | |
| W/O Pumps | 2.5 | 2.5 |
| With Pumps (50% of Engine) | 2.5 P & x 1.25 | 2.5 P 1 x 2.5 |
| Pump Speeds | | |
| Unloaded | Engine Speed | Engine Speed |
| Loaded | H/ Engine Speed | Engine Speed |
| Efficiency | | |
| Overall (W/O Pumps) | 0% | 0% |
| Overall (With Pumps) | 50% | 50% |

| Power Distribution | Eng. Power | Pump Power | Power Loss | Avail. Power Not Used | Eng. Power | Pump Power | Power Loss | Avail. Power Not Used |
|---|---|---|---|---|---|---|---|---|
| W/O Pumps | 100 | 0 | 100 | 0 | 50 | 0 | 50 | 50 |
| With Pumps | 66⅔ | 33⅓ | 33⅓ | 33⅓ | 100 | 50 | 50 | 0 |

Although efficiencies of both systems are the same for like operating conditions, the fuel economy does vary considerably. When operating without pumps, the overall output torque ratio of both systems is equal. However, it only requires 50 percent of engine power, in the system with torque regeneration, as compared to the known system, to obtain the same output torque. Presumably, the system with torque regeneration would have only about one-half of the known system's fuel consumption.

When operating with pumps, the system with torque regeneration, even while using about 50 percent more power, produces 100 percent more output torque and also permits the pumps to operate at normal design speed, whereas, the known system pump speed is at about 67 percent of desired design speed.

From the foregoing, it is believed that those familiar with the art will readily recognize and appreciate the novel concepts and features of the present invention. Obviously, while the invention has been described in relation to only two preferred embodiments, numerous variations, changes and substitutions of equivalents will present themselves to persons skilled in the art and may be made without necessarily departing from the scope and principles of this invention. As a result, the embodiments described herein are subject to various modifications, changes and the like, without departing from the scope and spirit of the invention. Consequently, the scope of this invention should be determined solely by reference to the claims appended thereto.

What is claimed is:

1. A high ratio hydrodynamic torque converter comprising:
   a. an impeller;
   b. at least one turbine;
   c. at least one reactor;
   d. an auxiliary element preceding said impeller;
   e. input means connected to said impeller;
   f. an output shaft connected to said at least one turbine;
   g. a stationary support connected to said reactor;
   h. said auxiliary element being connected to one of said output shaft and said stationary support; and
   i. a torque regenerative element located in said torque converter between said at least one reactor and said auxiliary element, said torque regenerative element being drivingly connected to said impeller, with said torque regenerative element absorbing a maximum torque when said torque converter is stalled and diminishing as said torque converter increases in speed ratio.

2. The torque converter of claim 1 wherein said auxiliary element is a second reactor and is connected to said stationary support.

3. The torque converter of claim 1 wherein said auxiliary element is a second turbine and is connected to said output shaft.

4. The torque converter of claim 1 further including a one-way brake for holding said torque regenerative element from rotating in one direction.

5. The torque converter of claim 1 further including a one-way brake for holding said at least one reactor from rotating in one direction.

6. The torque converter of claim 2 further including a first one-way brake for holding said at least one reactor from rotating in one direction.

7. The torque converter of claim 6 further including a second one-way brake for holding said second reactor from rotating in one direction.

8. A hydrodynamic torque converter having high torque multiplication at low output speed, said torque converter comprising:
   a. a toroidal fluid flow circuit having successively arranged therein:
      $a_1$· an impeller;
      $a_2$· at least one turbine;
      $a_3$· at least one reactor; and
      $a_4$· one of a further one of said at least one turbine and said at least one reactor preceding said impeller;
   b. input means connected to said impeller;
   c. an output shaft connected to said at least one turbine;
   d. a stationary support connected to said at least one reactor;
   e. a torque regenerative element interposed in said toroidal fluid flow circuit between said at least one reactor and said one of a further one of said at least one turbine and said at least one reactor; said torque regenerative element being connected to said impeller, with said torque regenerative element removing a maximum amount of energy from said fluid flow circuit at torque converter stall and transferring said energy back into said impeller; and
   f. means for selectively disconnecting said torque regenerative element from said impeller when said torque regenerative element stops removing energy from said fluid flow circuit as said turbine output shaft speed increases.

9. The torque converter of claim 8 wherein said one of a further one of said at least one turbine and said at least one reactor is a second turbine and is drivingly connected to said turbine output shaft.

10. The torque converter of claim 8 wherein said one of a further one of said at least one turbine and said at least one reactor is a second reactor and is connected to said stationary support.

11. The torque converter of claim 10 further including a one-way brake for holding one of said at least one and second reactors from rotating in one direction.

12. The torque converter of claim 10 further including first and second one-way brakes for holding said at least one and second reactors, respectively, from rotating in one direction.

13. A transmission system including:
 a. a hydrodynamic torque converter with a toroidal fluid flow circuit having successively arranged therein:
  $a_1$· an impeller;
  $a_2$· at least one turbine;
  $a_3$· at least one reactor;
  $a_4$· an auxiliary element preceding said impeller; and
  $a_5$· a torque regenerative element located between said at least one reactor and said auxiliary element, said torque regenerative element being interconnected with said impeller and having blade angles of a configuration to permit said torque regenerative element to take a maximum amount of energy from said fluid flow circuit at approximately the torque converter stall point and transfer said energy back into said impeller;
 b. input means connected to said impeller;
 c. a turbine output shaft connected to said at least one turbine;
 d. a stationary support connected to said at least one reactor;
 e. said auxiliary element being connected to one of said turbine output shaft and said stationary support;
 f. an auxiliary equipment pump;
 g. means for drivingly connecting said auxiliary equipment pump with said torque regenerative element (and said impeller) whereby said torque regenerative element is also capable of providing all or a substantial portion of the energy required to drive said auxiliary equipment pump at lower speeds of said at least one turbine; and
 h. means for disconnecting said torque regenerative element from said impeller (and said auxiliary equipment pump) when said torque regenerative element stops taking energy from said fluid flow circuit as said turbine output shaft speed substantially increases in speed ratio.

14. The transmission system of claim 13 wherein said auxiliary element is one of a further one of said at least one turbine and said at least one reactor.

15. The transmission system of claim 14 further including at least one one-way brake for holding said at least one reactor from rotating in one direction.

16. The transmission system of claim 13 wherein said auxiliary element is a second reactor and is connected to said stationary support.

17. The transmission system of claim 13 wherein said auxiliary element is a second turbine and is connected to said turbine output shaft.

18. A torque converter and control system therefor, said torque converter having a high torque multiplication at low output speed, said torque converter comprising a toroidal fluid flow circuit having arranged therein:
 a. power input means;
 b. impeller means connected to said power input means;
 c. a first output shaft drivingly connected to said impeller means;
 d. at least one turbine means;
 e. a second output shaft connected to said at least one turbine means;
 f. at least one reactor means;
 g. a stationary support connected to said at least one reactor means;
 h. an auxiliary element means preceding said impeller means and connected to one of said second output shaft and said stationary support; and
 i. torque regenerative element means interconnected with said impeller means and first output shaft and having blade angles of a configuration to absorb energy from said toroidal fluid flow circuit, this energy absorption being at maximum when said torque converter is stalled and diminishing as said torque converter increases in speed ratio,
 said control system comprising means for disconnecting said torque regenerative element means from said impeller means and said first output shaft when said torque regenerative element means stops absorbing energy from said toroidal fluid flow circuit as said second output shaft reaches a predetermined speed ratio, said power input means driving only said impeller means, with said torque regenerative element means, by reason of its connection with said impeller means and said first output shaft, providing not only at least a portion of the energy needed to drive said first output shaft, but also keeping said first output shaft from overspeeding when said first output shaft requires only a portion of the energy absorbed by said torque regenerative element means, with at least the remainder of said absorbed energy being transferred back to said impeller means.

19. The invention of claim 18 wherein said control system further includes means for reducing the speed of said power input means to keep said input means from exceeding a predetermined maximum speed when said at least remainder of said absorbed energy is transferred back to said impeller means.

20. The invention of claim 19 wherein said control system further includes a one-way brake for holding said at least one reactor means from rotating in one direction.

21. A torque converter and associated control system for applications requiring large amounts of torque at low torque converter turbine output speeds to operate auxiliary equipment where it is desired to have substantially constant input torque to the torque converter for all load conditions of the auxiliary equipment, comprising in combination:
 a. a prime mover for producing said input torque;
 b. a hydrodynamic torque converter having high torque multiplication at low converter output speeds, said torque converter having a toroidal fluid flow circuit including:
  1. an impeller connected to said prime mover;

2. a first output shaft connected to said impeller and drivingly connected to said auxiliary equipment;
3. at least one turbine;
4. a second output shaft connected to said at least one turbine;
5. at least one reactor;
6. a stationary support connected to said at least one reactor;
7. an auxiliary element preceding said impeller and connected to one of said second output shaft and said stationary support; and
8. a torque regenerative element interconnected with said impeller and interposed between said at least one reactor and said auxiliary element, said torque regenerative element absorbing a maximum torque from said toroidal fluid flow circuit when said torque converter is stalled and diminishing as said torque converter increases in speed ratio, said absorbed torque being:
 8a. fully redirected to said impeller for driving said at least first turbine in a first mode of operation when said auxiliary equipment is drawing substantially no power;
 8b. utilized to fully drive said first output shaft, via said impeller, in a second mode of operation when said auxiliary equipment is drawing maximum power and at low turbine output speeds;
 8c. partially redirected to said impeller (for driving said at least one turbine) and for fully driving said first output shaft (via said impeller), in a third mode of operation when said auxiliary equipment loads are moderate; and
 8d. combined with input torque (from said prime mover) to drive both said at least one turbine and said first output shaft at higher turbine output speeds in a fourth mode of operation;
c. a governor for controlling the maximum speed of said prime mover, said governor reducing the speed of said prime mover in the modes of operation wherein said absorbed torque is redirected to said impeller for driving said at least first turbine, in order to prevent said impeller from exceeding a predetermined maximum speed; and
d. a one-way brake for disconnecting said torque regenerative element from said impeller (and said first output shaft) when said torque regenerative element stops absorbing energy from said toroidal fluid flow circuit.

* * * * *